United States Patent
Koppe et al.

[11] 3,888,898
[45] June 10, 1975

[54] N,N'-BIS-(3-PHENOXY-2-HYDROXY-PROPYL)-ALKENEDIAMINES AND SALTS THEREOF

[75] Inventors: Herbert Koppe; Helmut Stahle; Werner Kummer; Gojko Muacevic; Werner Traunecker, all of Ingelheim am Rhein, Germany

[73] Assignee: Boehringer Ingelheim GmbH, Ingelheim am Rhein, Germany

[22] Filed: Feb. 27, 1973

[21] Appl. No.: 336,269

[30] Foreign Application Priority Data
Mar. 6, 1972 Germany............................ 2210620
Dec. 11, 1972 Germany........................... 2260444

[52] U.S. Cl. .................260/465 E; 260/247.2 A; 260/256.4 C; 260/268 C; 260/293.75; 260/340.5; 260/471 C; 260/471 R; 260/519; 260/553 R; 260/556 AR; 260/559 A; 260/570.7; 424/248; 424/250; 424/251; 424/267; 424/300; 424/304; 424/309; 424/319; 424/321; 424/322; 424/330

[51] Int. Cl........................................... C07c 121/78
[58] Field of Search ................................ 260/465 E

[56] References Cited
UNITED STATES PATENTS
3,459,782   7/1969   Koppe et al. ................. 260/465
3,541,130   11/1970  Koppe et al. ................. 260/465
3,732,277   5/1973   Koppe et al. ................. 260/465

*Primary Examiner*—Lewis Gotts
*Assistant Examiner*—Dolph H. Torrence
*Attorney, Agent, or Firm*—Hammond & Littell

[57] ABSTRACT

Compounds of the formula

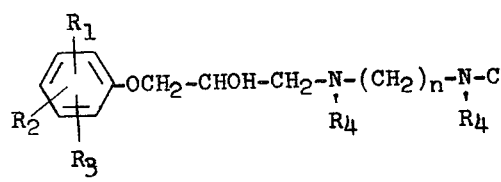 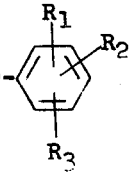

wherein
$R_1$ is —OH; —COOH; —CONH$_2$; —NO$_2$; —CF$_3$; halogen; alkyl of 4 to 5 carbon atoms; alkoxy of 4 to 5 carbon atoms; alkenyl of 3 to 5 carbon atoms; alkynyl of 2 to 5 carbon atoms; alkenyloxy of 3 to 5 carbon atoms; alkynyloxy of 3 to 5 carbon atoms; acyl; alkylthio of 1 to 4 carbon atoms; hydroxyalkyl of 1 to 5 carbon atoms; aryl; aryl-lower alkyl; aryloxy; arylamino; aryl-lower alkoxy; aryloxy-lower alkyl; cycloalkyl of 3 to 7 carbon atoms; alkoxyalkyl of 2 to 4 carbon atoms; alkylsulfonylamido of 1 to 4 carbon atoms; dialkylsulfonamido of 2 to 8 carbon atoms;
—(CH$_2$)$_x$—CN;
—(CH$_2$)$_x$—NH$_2$;
—(CH$_2$)$_x$—NH—COOR$_5$;
—(CH$_2$)$_x$—NH—acyl;
—(CH$_2$)$_x$—NH—CO—NR$_6$R$_7$;
—COOR;

where
$x$ is 0, 1, 2 or 3,
R is alkyl of 1 to 4 carbon atoms,
$R_5$ is alkyl of 1 to 3 carbon atoms, and
$R_6$ and $R_7$ are each hydrogen, alkyl of 1 to 4 carbon atoms, alkenyl of 3 to 5 carbon atoms or, together with each other and the nitrogen atom to which they are attached, a 5- to 6-membered heterocycle;
or, where $R_4$ is other than hydrogen, also alkyl of 1 to 3 carbon atoms or alkoxy of 1 to 3 carbon atoms;
$R_2$ is hydrogen, halogen, alkyl of 1 to 5 carbon atoms, alkoxy of 1 to 5 carbon atoms, alkenyl of 2 to 5 carbon atoms or alkenyloxy of 2 to 5 carbon atoms;
$R_3$ is hydrogen, halogen, alkyl of 1 to 5 carbon atoms or alkoxy of 1 to 5 carbon atoms;
$R_2$ and $R_3$, together with each other, form a saturated or unsaturated carbocyclic ring or heterocyclic ring;
$R_4$ is hydrogen, alkyl of 1 to 5 carbon atoms or aralkyl; and
$n$ is an integer from 1 to 10, inclusive;
and their non-toxic, pharmacologically acceptable acid addition salts; the compounds as well as their salts are useful as β-adrenergic blocking agents and hypotensives.

4 Claims, No Drawings

N,N'-BIS-(3-PHENOXY-2-HYDROXY-PROPYL)-ALKENEDIAMINES AND SALTS THEREOF

This invention relates to novel N,N'-bis(3-phenoxy-2-hydroxy-n-propyl)-alkylenediamines and their non-toxic acid addition salts, as well as to methods of preparing these compounds.

More particularly, the present invention relates to a novel class of compounds represented by the formula

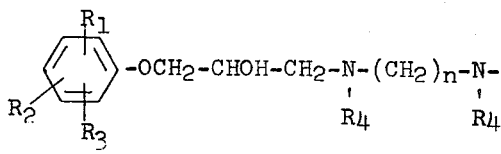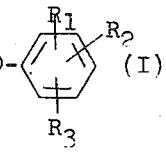 (I)

wherein $R_1$ is —OH; —COOH; —CONH$_2$; —NO$_2$; —CF$_3$; halogen; alkyl of 4 to 5 carbon atoms; alkoxy of 4 to 5 carbon atoms; alkenyl of 3 to 5 carbon atoms; alkynyl of 2 to 5 carbon atoms; alkenyloxy of 3 to 5 carbon atoms; alkynyloxy of 3 to 5 carbon atoms; acyl; alkylthio of 1 to 4 carbon atoms; hydroxyalkyl of 1 to 5 carbon atoms; aryl; aryl-lower alkyl; aryloxy; arylamino; aryl-lower alkoxy; aryloxy-lower alkyl; cycloalkyl of 3 to 7 carbon atoms; alkoxyalkyl of 2 to 4 carbon atoms; alkylsulfonylamido of 1 to 4 carbon atoms; dialkylsulfonamido of 2 to 8 carbon atoms;

—(CH$_2$)$_x$—CN;

—(CH$_2$)$_x$—NH$_2$;

—(CH$_2$)$_x$—NH—COOR$_5$;

—(CH$_2$)$_x$—NH—acyl;

—(CH$_2$)$_x$—NH—CO—NR$_6$R$_7$;

—COOR;

where $x$ is 0, 1, 2 or 3,

R is alkyl of 1 to 4 carbon atoms;

$R_5$ is alkyl of 1 to 3 carbon atoms, and $R_6$ and $R_7$ are each hydrogen, alkyl of 1 to 4 carbon atoms, alkenyl of 3 to 5 carbon atoms or, together with each other and the nitrogen atom to which they are attached, a 5- to 6-membered heterocycle; or, when $R_4$ is other than hydrogen, also alkyl of 1 to 3 carbon atoms or alkoxy of 1 to 3 carbon atoms;

$R_2$ is hydrogen, halogen, alkyl of 1 to 5 carbon atoms, alkoxy of 1 to 5 carbon atoms, alkenyl of 2 to 5 carbon atoms or alkenyloxy of 2 to 5 carbon atoms;

$R_3$ is hydrogen, halogen, alkyl of 1 to 5 carbon atoms or alkoxy of 1 to 5 carbon atoms;

$R_2$ and $R_3$, together with each other, form a saturated or unsaturated carbocyclic ring or heterocyclic ring;

$R_4$ is hydrogen, alkyl of 1 to 5 carbon atoms or aralkyl; and $n$ is an integer from 1 to 10, inclusive;

and their non-toxic, pharamcologically acceptable acid addition salts.

In the definition of substituent $R_1$ in formula I above, the preferred embodiments of alkyl of 4 to 5 carbon atoms are tert.butyl or tert.amyl; the preferred embodiment of alkenyl is allyl; the preferred embodiment of alkynyl is ehtynyl; the preferred embodiments of alkenyloxy and alkynyloxy are allyloxy and proparglyloxy, respectively; the preferred embodiments of acyl are aliphatic acyl of 1 to 5 carbon atoms and aromatic acyl of 7 to 11 carbon atoms, the latter optionally having a halogen, lower alkyl or lower alkoxy substituent attached thereto; the preferred embodiments of hydroxyalkyl are hydroxymethyl and hydroxyethyl; the preferred embodiments of aryl are aryl of 6 to 10 carbon atoms, optionally having a halogen, lower alkyl or lower alkoxy substituent attached thereto; the preferred embodiments of alkyl- and dialkylsulfonylamido are methyl- and dimethylsulfonylamido, respectively; the preferred embodiment of R is methyl; the preferred embodiments of the acyl moiety in —(CH$_2$)$_x$—NH—acyl are alkanoyl of 1 to 4 carbon atoms and benzoyl; and the preferred embodiments of the heterocycle formed by $R_6$ and $R_7$ are piperidino, piperazineo, morpholino and pyrimidino.

The preferred embodiments of the carbocyclic and heterocyclic rings formed by $R_2$ and $R_3$ are naphthyl, tetrahydronaphthyl, indanyl and indolyl.

The compounds embraced by formula I above may be prepared by the following methods:

Method A

By reacting a compound of the formula

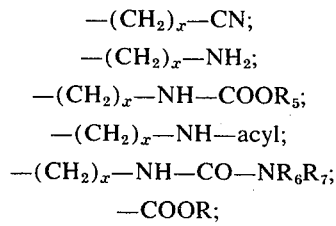 (II)

wherein $R_1$ to $R_3$ have the meanings defined above, and Z is

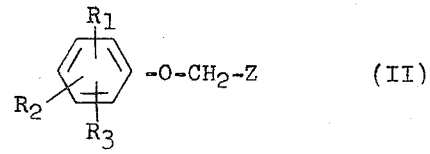

(Hal = halogen), with an alkylenediamine of the formula

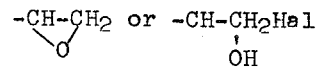 (III)

wherein $R_4$ and $n$ have the meanings defined above.

Method B

By reacting a compound of the formula

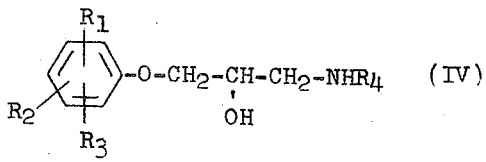 (IV)

wherein $R_1$ to $R_4$ have the meanings previously defined, with an alkylenedihalide of the formula

 (V)

wherein $n$ and Hal have the above-defined meanings. The reaction proceeds in 2 steps with intermediate formation of a compound of the formula

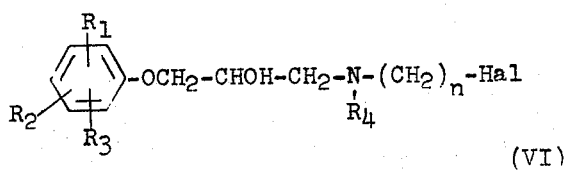

$$\text{(VI)}$$

wherein $R_1$ to $R_4$, $n$ and Hal have the meanings defined above. It is also possible to produce a compound of the formula I directly from a compound of the formula VI by reacting it with a compound of the formula IV.

Method C

By splitting off an easily removable protective group from a compound of the formula

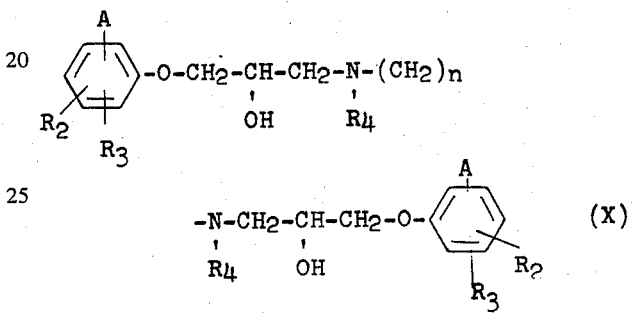

$$\text{(VII)}$$

wherein $R_1$ to $R_4$ and $n$ have the above-defined meanings and G is hydrolytically removable group such as acyl or acetal.

Method D

By splitting off a protective group from a bis-tertiary amine of the formula

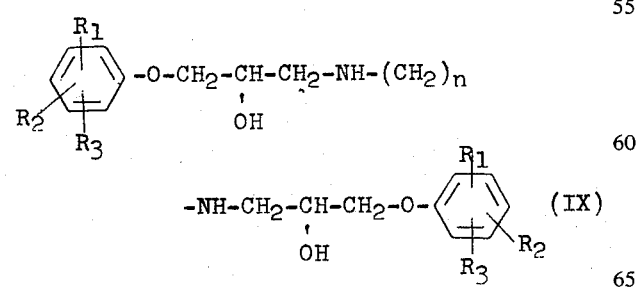

$$\text{(VIII)}$$

wherein $R_1$ to $R_3$ and $n$ have the above-defined meanings and Sch is an easily removable amino-protective group, such as benzyl. This method leads to compounds of the formula I wherein $R_4$ is hydrogen.

Method E

By alkylating a compound of the formula

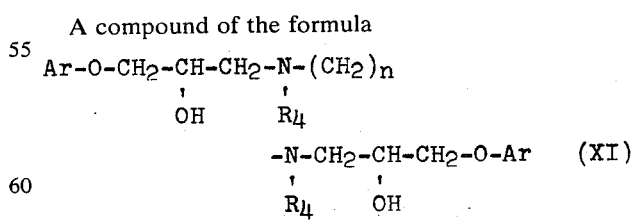

$$\text{(IX)}$$

wherein $R_1$ to $R_3$ and $n$ have the above defined meanings, for example with an electrophilic compound of the formula $R_4$-X, wherein $R_4$ has the meaning previously defined and X is an anionically easily removable group, such as halogen or alkyl or aryl-sulfonyl, or with an aliphatic ketone corresponding to radical $R_4$ under reducing conditions.

Further methods for producing the compounds of the formula I include, for example, converting a starting compound wherein the bis-(aryloxypropanolamine)-alkylene structure is already present, but one of the substituents, such as CN, is still missing or only present in the form of a precursor into a compound of the formula I by introducing the missing substituent or by converting the precursor of the substituent into the substituent-CN.

For example, the following methods are illustrative thereof.

Method F

A compound of the formula (structure)

$$\text{(X)}$$

wherein $R_2$ and $R_4$ and $n$ have the previously defined meanings and A represents a group convertible into $R_1$ pursuant to conventional methods, such as —$CONH_2$ or —CH=NOH group (convert into —CN by dehydration), or an amino group (converts into cyano by diazotization and heating with copper(I)-cyanide), may be converted into a compound of the formula I by applying the respective conventional treatment required in each case, i.e., dehydration or diazotization and heating with a copper-I-salt.

The compounds of the formula X already comprise the finished bis-(aryloxypropanolamine)-alkylene structure and may therefore be prepared pursuant to method A. In case A represents an $NH_2$-group, it is advantageously obtained by reduction of the corresponding nitro compound. In case A represents a COOH-group, it is obtained by saponification of a cyano or an ester group. A hydroxyalkyl group may be obtained by hydrolysis of the corresponding haloalkyl group or by splitting of an acyloxyalkyl group by hydrolysis or hydrogenation.

Method G

A compound of the formula

Ar-O-CH₂-CH-CH₂-N-(CH₂)ₙ
              |        |
             OH       R₄

-N-CH₂-CH-CH₂-O-Ar     (XI)
 |       |
 R₄     OH wherein $R_4$ and $n$ have the previously defined meanings and Ar is

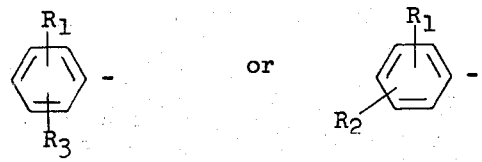

whereby $R_1$, $R_2$ and $R_3$ have the previously defined meaning, may be halogenated by reacting it with chlorine or bromine in acetic acid or with a mixture of hydrogen perioxide and the corresponding hydrohalic acid at elevated temperature.

it is further possible to prepare a compound of the formula I by:

Method H

Reacting a compound of the formula

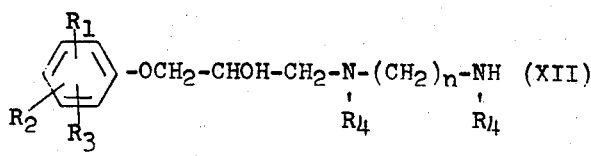

wherein $R_1$ to $R_4$ and n have the previously defined meanings, with a compound of the formula II.

A compound of the formula I may also be prepared by:

Method I

Reacting a compound of the formula

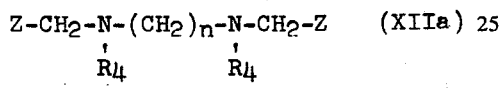

wherein $R_4$, n and Z have the previously defined meanings, with a phenol of the formula

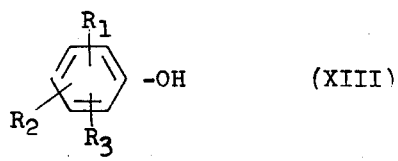

wherein $R_1$ to $R_3$ have the previously defined meanings, or with a salt thereof. This method is primarily suitable for the preparation of a compound of the formula I wherein $R_4$ is alkyl.

Most of the starting compounds of the formulas II to XIII are known. Those which are not known may be prepared by conventional methods. Thus, an epoxide of the formula II may be obtained by reacting the corresponding phenol of the formula XIII or a salt thereof (preferably an alkali metal salt) with epichlorohydrin; a halohydrin of the formula II may be otained by cleavage of the epoxide with the corresponding hydrohalic acid.

A compound of the formula III wherein $R_4$ is alkyl may be obtained from the corresponding compound of the formula III wherein $R_4$ is hydrogen, by treatment with a conventional alkylating agent $R_4$-X (X = radical of a reactive ester, such as halogen or toluenesulfonyloxy). Secondary alkyl groups may also be obtained by reductive amination with the corresponding ketone, such as acetone, and $NaBH_4$.

A compound of the formula IV may be obtained by reacting a compound of the formula II with an amine of the formula $NH_2$—$R_4$, where $R_4$ has the meanings defined above.

A compound of the formula V is obtainable from a corresponding dialcohol HO—$(CH_2)_n$—OH by reaction with a conventional halogenating agent, such as $SOCl_2$ or $PCl_5$.

A compound of the formula VI may be prepared by reacting a corresponding haloalkylamine of the formula $R_4NH$—$(CH_2)_n$—Hal   XIV.

wherein $R_4$, n and Hal have the previously defined meanings, with a compound of the formula II.

A compound of the formula VII may be prepared from a halohydrin of the formula II by reacting the latter with a conventional acylating or acetalizing agent, such as acetyl chloride or tetrahydropyranyl ether, and subsequently reacting the intermediate compound of the formula

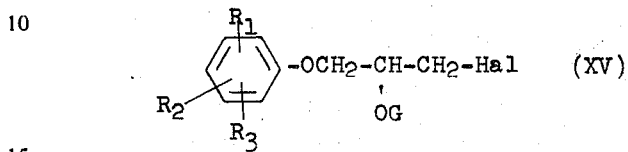

wherein $R_1$ to $R_3$, G and Hal have the previously defined meanings, with a compound of the formula III.

A compound of the formula VIII is advantageously prepared by reacting a compound of the formula II with a diamine of the formula $$SchHN\text{—}(CH_2)_n\text{—}NHSch$$

XVI.

wherein Sch and n have the previously defined meanings. A compound of the formula XVI may be produced from a compound of the formula III wherein $R_4$ is hydrogen by reacting the latter with a conventional reagent for forming protective groups, such as benzyl bromide, acetyl chloride or carbobenzoxy chloride.

The compounds of the formulas IX to XI already contain the bis-(aryloxypropanolamine)-alkylene structure; therefore, they may be obtained with the aid of method B, where substitution of the phenyl moieties of the compound of the formula II has to correspond to that of the desired intermediate product of the formulas IX, X or XI.

A compound of the formula XII may be obtained by reacting a compound of the formula VI (the preparation of which has been described above) with an amine of the formula $NH_2$—$R_4$, where $R_4$ has the meanings defined above.

A compound of the formula XIIa may be obtained from a compound of the formula III by reacting the latter with epichlorohydrin. A halohydrin of the formula XIIa thus obtained may be converted into an epxoide of the formula XIIa by means of aqueous sodium hydroxide.

The compounds embraced by formula I possess two asymmetric carbon atoms and occur therefore as racemates, as well as in the form of optical antipodes. The racemates may be separated with the aid of optically active auxiliary acids, such as di-O,O-p-toluyl-D-tartaric acid, into their optical antipode components.

the compounds of the formula I, both in the form of racemates or optical antipodes, form acid addition salts with inorganic or organic acids. Examples of non-toxic, pharmacologically acceptable acid addition salts are those formed with hydrochloric acid, hydrobromic acid, sulfuric acid, maleic acid, lactic acid, methanesulfonic acid, oxalic acid, tartaric acid, 8-chlorotheophylline or the like.

The following examples further illustrate the present invention and will enable others skilled in the art to understand it more completely. It should be understood, however, that the invention is not limited solely to the particular examples given below.

EXAMPLE 1

N,N'-Bis-[2-hydroxy-3-(2'-allyl-phenoxy)-1-propyl]-ethylene-diamine · 2 HCl by method A 19 gm (0.1 mol) of 1-(2'-allyl-phenoxy)-2,3-epoxypropane was dissolved in 150 ml of ethanol, 3 gm (0.05 mol) of ethylenediamine were added, and the mixture was refluxed for 2 hours. After having cooled off, the solvent was distilled off, and the residue was dissolved in dilute HCl. Insoluble matter was separated, and the aqueous solution was made alkaline with NaOH. The precipitated basic components were extracted with ether, and the organic phase was separated, washed with water and dried over MgSO₄. After having distilled off the ether, 13 gm of residue remained, which were dissolved in little ethanol and admixed with ehtereal HCl. The precipitate was recrystallized twice from methanol, subsequently digested with water, vacuum-filtered off and dried, yielding 4.5 gm of the compound of the formula

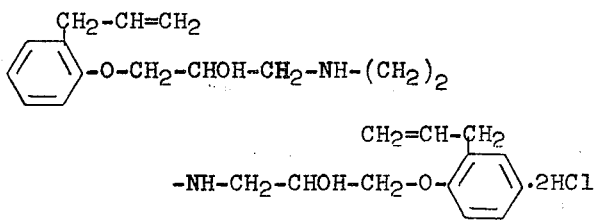

which had a melting point of 248°–251°C.

EXAMPLE 2

N,N'-bis-[2'-hydroxy-3'-(3''-hydroxymethyl-phenoxy)-1'-propyl]-1,4-butylenediamine · 2 HCl by method A 12 gm (0.066 mol) of 1-(3'-hydroxymethyl-phenoxy)-2,3-epoxy-propane were refluxed in 100 ml of ethanol with 2.93 gm (0.033 mol) of 1,4-diaminobutane for 2 hours. After having distilled off the solvent, the residue was dissolved in ethanol and ethereal HCl was added. The hydrochloride precipitated as a viscous oil. It was digested several times with ether and then boiled with ethanol. After cooling, a colorless crystalline substance (3.4 gm) was obtained, which, upon recrystallization from methanol by addition of ether, melted at 189°–190°C. It was identified to be the compound of the formula

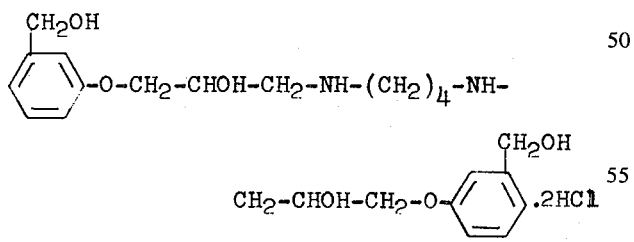

EXAMPLE 3

N,N'-bis-[2'-hydroxy-3'-(2''-cyano-phenoxy)-1-propyl]-1,4-diamino-butane · 2 HCl by method A 20 gm (0.114 mol) of 1-(2'-cyano-phenoxy)-2,3-epoxy-propane and 3.7 gm (0.042 mol) of 1,4-diaminobutane were refluxed in 100 ml of methanol for 2 hours. After having distilled off the methanol, the residue was dissolved in ethanol and acidified with ethereal HCl. The precipitated crystalline substance was recrystallized from methanol, yielding 3.5 gm of the compound of the formula

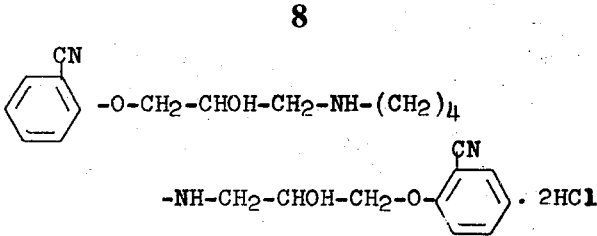

which had a melting point of 227°–228°C

EXAMPLE 4

N,N'-bis-[2'-hydroxy-3'-(2''-allyloxy-phenoxy)-1-propyl]-1,2-ethylenediamine · 2 HCl by method A 10.3 gm (0.05 mol) of 1-(2'-allyloxy-phenoxy)-2,3-epoxy-propane and 1.5 gm (0.025 mol) of ethylenediamine were refluxed in 100 ml of ethanol for 2 hours. After having distilled off the solvent, the solid residue (12.6 gm) was recrystallized from ethyl acetate by addition of petroleum ether. The base thus obtained was dissolved in methanol, and ethereal HCl was added. The hydrochloride which crystallized out was recrystallized once more from methanol, yielding 2.4 gm of the compound of the formula

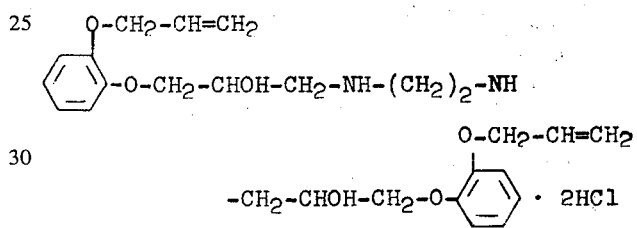

which had a melting point of 188°–190°C.

EXAMPLE 5

N,N'-bis-[2'-hydroxy-3'-(4''-acetylamino-phenoxy)-1-propyl]-1,6-hexamethylenediamine by method A 20.7 gm (0.1 mol) of 1-(4'-acetylamino-phenoxy)-2,3-epoxy-propane were refluxed with 5.8 gm (0.05 mol) of 1,6-hexamethylenediamine in 200 ml of ethanol for 2 hours. After cooling, the reaction product was isolated as a colorless crystalline substance and recrystallized several times from methanol, yielding 5.8 gm of the compound of the formula

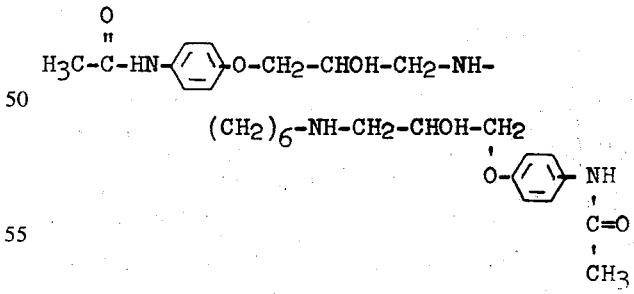

which had a melting point of 179°–181°C.

EXAMPLE 6

N,N'-bis-[2'-hydroxy-3'-(2''-cyano-phenoxy)-1'-propyl]-1,6-hexamethylenediamine · 2 HCl by method A 87.5 gm (0.5 mol) of 1-(2'-cyano-phenoxy)-2,3-epoxy-propane were refluxed with 29 gm (0.25 mol) of hexamethylenediamine in 750 ml of methanol for 3 hours. After having distilled off the solvent, the residue was treated with about 700 ml of dilute HCl, and insoluble matter was separated. The aqueous phase fractionally made alkaline with NaOH, and the basic fractions precipitating between pH 7.5 and 8.5 were taken up in ether and washed with water. After drying and distilling off the ether, 16 gm of the free base remained behind, which were dissolved in methanol and acidified with alcoholic HCl. Upon addition of ether, 9 gm of the analytically pure hydrochloride, m.p. 200°–203°C, crystallized out.

EXAMPLE 7

N,N'-bis-[2'-hydroxy-3'-(2''-hydroxycarbonylphenoxy)-1-propyl]-1,2-ethylenediamine · 2 HCl by method F 8.5 gm of N,N'-bis-[2'-hydroxy-3'-(2''-cyanophenoxy)-1'-porpyl]-1,2-ethylenediamine were refluxed for 5 hours in a mixture of 20 ml. of NaOH and 80 ml of water, whereby the diamine dissolved. After cooling, the free acid precipitated out in form of crystals upon acidification with dilute HCl. It was separated by vacuum filtration and recrystallized from water, yielding 3.5 gm of the compound of the formula

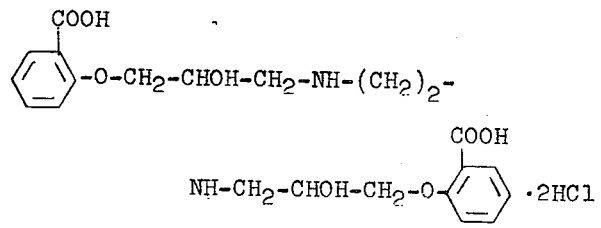

which had a melting point of 263 –266°C.

EXAMPLE 8

N,N'-bis-isopropyl-N,N'-bis-[2'-hydroxy-3'-(m-tolyloxy)-1'-propyl]-1,2-ethylenediamine dioxalate by method B 22.3 gm (0.1 mol) of 1-(m-tolyloxy)-3-isopropylamino-2-propanol were refluxed with 9.5 gm (0.05 mol) of ethylene-1,2-dibromide and 12.6 gm (0.15 mol) of sodium bicarbonate in a mixture of 100 ml of tetrahydrofuran and 25 ml of dimethylformamide for 17 hours, while stirring. After having distilled off the solvent, the residue was acidified with dilute HCl, extracted twice with $CHCl_3$, the organic phase was washed with water and dried over $HgSO_4$, and the $CHCl_3$ was distilled off. The residue (19 gm) was digested with water, vacuum-filtered and admixed with dilute NaOH. The precipitated basic components were taken up in ether, and the organic phase was washed with water and dried over $MgSO_4$.

After distilling off the ether, the residue was dissolved in acetone, and the solution was admixed with a solution of oxalic acid in acetone. After addition of ether, the oxalate separated out as a viscous substance. It was recrystallized from acetonitrile, yielding 4 gm of the compound of the formula

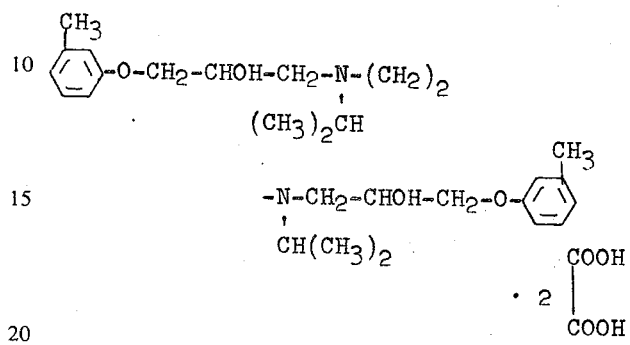

which had a melting point of 75°–80°C.

EXAMPLE 9

N,N'-bis-[2'-hydroxy-3'-(4''-amino-phenoxy)-1'-propyl]-1,4-butylenediamine by method F 3.5 gm (0.0073 mol) of N,N'-bis-[2'-hydroxy-3'-(4''-nitro-phenoxy)-1-propyl]-1,4-butylenediamine were hydrogenated in 50 ml of methanol in the presence of Raney nickel at room temperature and atmospheric pressure. After the absorption of hydrogen had terminated, the catalyst was separated, the solvent was distilled off, and the viscous residue was boiled with ethyl acetate. The base separated out after cooling as colorless crystallizate, which was separated and recrystallized once more, yielding 2.2 gm of the above named product which had a melting point of 105°–108°C.

Analogous to Example 3 (method A) the following additional compounds of the formula I were prepared from the corresponding epoxide of the formula II and the corresponding alkylenediamine of the formula III:

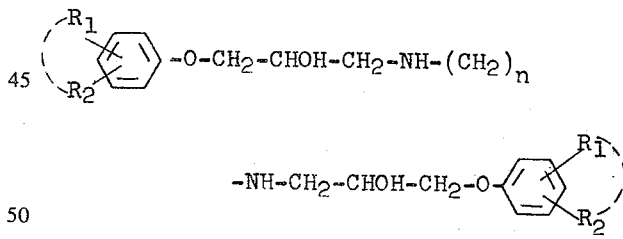

TABLE

| Example No. | $R_1$ | $R_2$ | n | m.p. of hydrochloride |
|---|---|---|---|---|
| 10 | 2-CN | H | 2 | 212–215°C |
| 11 | 2-$CH_2$-CH=$CH_2$ | H | 6 | 165–168°C |
| 12 | 2-O-$CH_2$-CH=$CH_2$ | H | 6 | 133–137°C |
| 13 | 2-CN | H | 8 | 193–195°C |
| 14 | 2-CN | H | 9 | 182–185°C |
| 15 | 2-CN | H | 5 | 202–204°C |
| 16 | 4-$NO_2$ | H | 4 | 217–219°C |

TABLE (cont'd.)

| Example No. | $R_1$ | $R_2$ | n | m.p. of hydrochloride |
|---|---|---|---|---|
| 17 | 3-$CF_3$ | H | 6 | 190-193°C |
| 18 | 4-$CH_3$-CONH- | H | 7 | 240-242°C |
| 19 | 4-$CH_3$-CONH- | H | 3 | 271-273°C |
| 20 | 4-$CH_3$-CONH- | H | 4 | 268-271°C |
| 21 | 4-$CH_3$-CONH- | H | 10 | 177-178°C (base) |
| 22 | 4-$CH_3$-CONH- | H | 2 | 270-272°C |
| 23 | 2-CN | H | 3 | 219-220°C |
| 24 | 2-CN | H | 7 | 187-190°C |
| 25 | 4-$H_5C_2$-C($CH_3$)($CH_3$)- | H | 6 | 205-207°C |
| 26 | 4-$H_3CO$-CO- | H | 6 | 252-254°C |
| 27 | 2-$CONH_2$ | H | 6 | 175-180°C (base) |
| 28 | 4-$H_3C$-CO-NH-$CH_2$- | H | 6 | 176-178°C (base) |
| 29 | 4-$H_3CO$-CO- | H | 4 | 156-157°C (base) |
| 30 | 2-O-$CH_2$-C≡CH | H | 6 | 86-89°C (base) |
| 31 | 2-CN | 5-$CH_3$ | 6 | 206-209°C |
| 32 | 4-$NO_2$ | H | 6 | 196-198°C |
| 33 | 4-$H_3CO$-CO- | H | 2 | 238-240°C |
| 34 | 2,3 - Benzo- | | 6 | 198-200°C |
| 35 | 4-CN | H | 6 | 210-211°C |
| 36 | 2-$OCH_3$ | 4-CN | 6 | 178-182°C |
| 37 | 4-$CH_2OH$ | H | 6 | 285-288°C |
| 38 | 2-C≡CH | H | 6 | 140-142°C |
| 39 | 2-NH-CO-$NHCH_3$ | H | 6 | 150-153°C (base) |
| 40 | 2-$CH_2OH$ | H | 6 | 156-158°C |
| 41 | 2-$C_6H_{11}$ | H | 6 | |
| 42 | 2,4-di-Cl | 6-CN | 5 | |
| 43 | 4-$CH_2$-NH-CO-$NHCH_3$ | H | 6 | |
| 44 | 4-tert.$C_4H_9$ | H | 6 | |
| 45 | 3,4-$(CH_2)_3$- | | 6 | |
| 46 | 2,3-$(CH_2)_4$- | | 6 | |
| 47 | 4-$C_2H_5$-CO | H | 2 | 145-148°C (base) |

EXAMPLE 48

N,N'-bis-isopropyl-N,N'-bis[2'-hydroxy-3'-(2''-cyano-phenoxy)-1'-propyl]-1,6-hexamethylenediamine · 2 HCl by method B 11.7 gm (0.05 mol) of 1-(2'-cyano-phenoxy)-3-isopropylamino-2-propanol were refluxed with 6.1 gm (0.025 mol) of 1,6-dibromohexane in 80 ml of ethanol in the presence of 5 gm (0.06 mol) of $NaHCO_3$ for 20 hours. Thereafter, the solvent was distilled off, the residue was digested with dilute NaOH, and the basic components were taken up in $CHCl_3$. The organic phase was washed with water and dried over $Na_2SO_4$. After having distilled off the $CHCl_3$, the viscous residue was purified by column-chromatography. The base was dissolved in a little ethanol, and ethereal HCl was added. The hydrochloride crystallized out in the form of colorless crystals after addition of ether. Yield: 4.5 gm; m.p. 189° – 192°C.

EXAMPLE 49

N,N'-bis-[2'-hydroxy-3'-(3'',5''-dibromo-4''-amino-phenoxy)-1'-propyl]-1,6-hexamethylenediamine · 4 HBr by method G A mixture consisting of 1.115 gm (0.0025 mol) of N,N'-bis-[2'-hydroxy-3'-(4''-amino-phenoxy)-1-propyl]-1,6-hexamethylenediamine, 12 ml. of 65 % HBr and 4 ml of water was heated to 45°C. While stirring, 1.2 gm (0.01 mol) of 30% $H_2O_2$ were added. In the course of the resulting exothermic reaction yellow crystals formed, which were vacuum-filtered off after the reaction had gone to completion. The raw product (2.5 gm) was recrystallized from methanol by addition of ether, yielding 2.1 gm of the compound of the formula

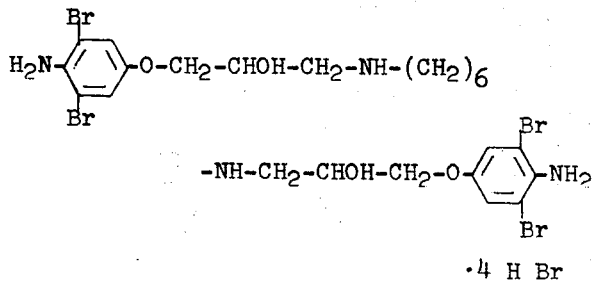

which had a melting point of 228°–230°C.

EXAMPLE 50

N,N'-bis[2'-hydroxy-3'-(2''-aminomethyl-phenoxy)-1'-propyl]-1,6-hexamethylenediamine · 2 HCl by method F 7.1 gm (0.0152 mol) of N,N'-bis-[2'-hydroxy-3'-(2''-cyano-phenoxy)-1'-propyl]-1,6-hexamethylenediamine were hydrogenated in a mixture of 250 ml of methanol and 20 ml of $NH_3$ in the presence of Raney nickel. After absorption of the theoretical quantity of hydrogen, the catalyst was separated, and the solvent was distilled off. The residue (5.2 gm) was dissolved in methanol, alcoholic HCl was added, the mixture was filtered, and the filtrate was admixed with ether, whereupon 4.9 gm of the dihydrochloride crystallized out as a colorless substance which had a melting point of 223°–226°C.

EXAMPLE 51

Using a procedure analogous to that described in Example 9, N,N'-bis-[2'-hydroxy-3'-(4''-amino-phenoxy)-1'-propyl]-1,6-hexamethylenediamine · 4 HCl, m.p. 129°–131°C (base), was prepared from N,N'-bis[2'-hydroxy-3'-(4''-nitrophenoxy)-1'-propyl]-1,6-hexamethylenediamine.

EXAMPLE 52

N,N'-bis-[2'-hydroxy-3'-(2''-hydroxycarbonyl-phenoxy)-1'-propyl]-1,4-tetramethylenediamine · 2 HCL by method F 6.7 gm of N,N'-bis-[2'-hydroxy-3'-(2''-cyano-phenoxy)-1'-propyl]-1,4-tetramethylenediamine were refluxed in a mixture of 20 ml of aqueous 40% NaOH and 80 ml of water for 8 hours. After cooling, the mixture was acidified with HCl. The precipitated solid substance was separated and recrystallized from methanol by addition of ether. Yield: 2.4 gm; m.p. 208°–209°C.

EXAMPLE 53

N,N'-bis-[2'-hydroxy-3'-(4''-hydroxycarbonyl-phenoxy)-1'-propyl]-1,4-tetramethylenediamine · 2 HCl by method F 5.3 gm of N,N'-bis-[2'-hydroxy-3'-(4''-methoxycarbonyl-phenoxy)-1'-propyl]-1,4-tetramethylenediamine · 2 HCl were refluxed with HCl for 3 hours. After cooling, the free base crystallized out and was recrystallized from water. Yield: 4.4 gm; m.p. 293°C.

EXAMPLE 54

Using a procedure analogous to that described in Example 53, N,N'-bis-[2'-hydroxy-3'-(4''-hydroxycarbonylphenoxy)-1'-propyl]-1,6-hexamethylenediamine · 2 HCl, m.p. 287°–288°C, was prepared from N,N'-bis-[2'-hydroxy-3'-(4''-methoxycarbonyl-phenoxy)-1'-propyl]-1,6-hexamethylenediamine.

EXAMPLE 55

Using a procedure analogous to that described in Example 53, N,N'-bis-[2'-hydroxy-3'-(4''-hydroxycarbonylphenoxy)-1'-propyl]-1,2-ethylenediamine · 2 HCl, m.p. 300°C, was prepared from N,N'-bis-[2'-hydroxy-3'-(4''-methoxycarbonyl-phenoxy)-1'-propyl]-1,2-ethylenediamine.

EXAMPLE 56

N,N'-Bis-methyl-N,N'-bis-[2'-hydroxy-3'-(2''-cyano-phenoxy)-1'-propyl]-1,2-ethylenediamine dioxalate by method E A mixture consisting of 4.1 gm (0.01 mol) of N,N'-bis-[2'-hydroxy-3'-(2''-cyano-phenoxy)-1'-propyl]-1,2-ethylenediamine, 100 ml of $CH_3OH$, 2.8 gm of $CH_3I$ (0.022 mol) and 4 gm of $NaHCO_3$ was heated at its boiling point for 3 hours. Thereafter, the solvent was distilled off, the residue was digested with dilute NaOH, the base was extracted with $CHCl_3$, and the organic phase was washed with $H_2O$ and dried over $MgSO_4$. After distilling off the $CHCl_3$, the residue was purified by column-chromatography. The fraction containing the pure diamine was evaporated in vacuo, the residue was dissolved in a little methanol, and a solution of oxalic acid in acetone was added. The colorless substance which crystallized out after a short time (1.2 gm) was identified to be the compound of the formula

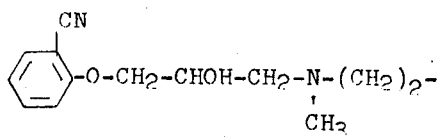

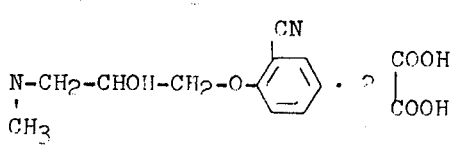

having a melting point of 152°–154°C.

EXAMPLE 57

N,N'-Bis-[2'-hydroxy-3'-(2''-cyano-4'',6''-dichloro-phenoxy)-1'-propyl]-1,5-pentamethylenediamine · 2 HCl by method G 4.52 gm (0.01 mol) of N,N'-bis-[2'-hydroxy-3'-(2''-cyano-phenoxy)-1'-propyl]-1,5-pentamethylenediamine were dissolved in 50 ml of conc. HCl, and the solution was heated to 40'C. While stirring, 2.42 gm of water were added dropwise, whereby the temperature rose to about 60°C. After one hour the reaction mixture was cooled, evaporated in vacuo, and the residue, after extraction with ether, was made alkaline with NaOH. The basic components were taken up in CHCl$_3$, and the organic phase was washed with H$_2$O and dried over MgSO$_4$. The CHCl$_3$ was distilled off, and the residual mixture of bases was column-chromatographically purified. The diamine was dissolved in a little ethanol, and ethereal HCl was added, whereby a colorless substance crystallized out, yielding 0.8 gm of the compound of the formula

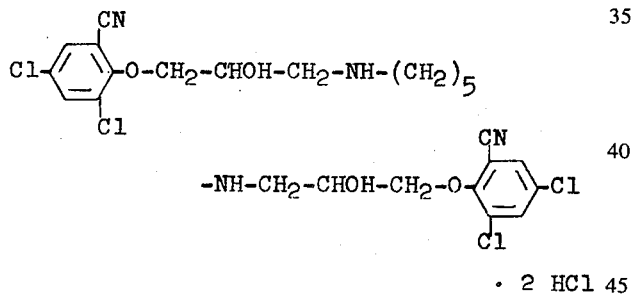

Using a procedure analogous to that described in Example 1, the following compounds were also prepared:

EXAMPLE 58

N,N'-Bis-[2'-hydroxy-3'-(5'',6'',7'',8''-tetrahydro-1''-naphthoxy)-1'-propyl]-1,6-hexamethylenediamine dihydrochloride, m.p. 162°–163°C, of the formula

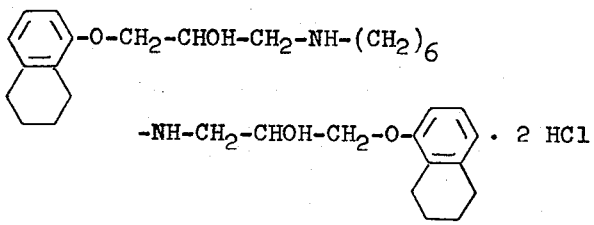

from 1-(5',6',7',8'-tetrahydro-1'-naphthoxy)-2,3-epoxypropane and hexamethylenediamine.

EXAMPLE 59

N,N'-Bis-[2'-hydroxy-3'-(4'''-tert.butyl-phenoxy)-1'-propyl]-1,6-hexamethylenediamine, m.p. 223°–226°C, from 1-(4'-tert.butyl-phenoxy)-2,3-epoxy-propane and hexamethylenediamine.

EXAMPLE 60

N,N'-Bis-[2'-hydroxy-3'-(5''-indanyloxy)-1'-propyl]-1,6-hexamethylenediamine dihydrochloride, m.p. 255°–258°C, of the formula

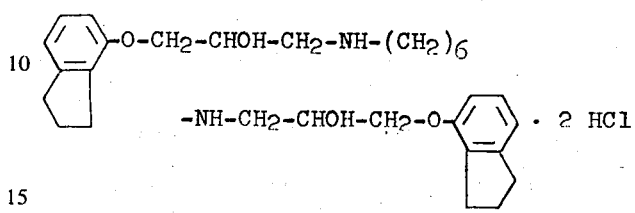

from 1-(5'-indanyloxy)-2,3-epoxy-propane and hexamethylenediamine.

EXAMPLE 61

N,N'-Bis-[1'-(2''-chloro-5''-methyl-phenoxy)-2'-hydroxy-propyl-3']-butylene-1,4-diamine · 2 HCl by method A 8.45 gm (0.042 mol) of 1-(2'-chloro-5'-methyl-phenoxy)-2,3-epoxy-propane were dissolved in 75 ml of ethanol, and 1.85 gm (0.021 mol) of butylenediamine-1,4 were added. The mixture was refluxed for two hours, and was then evaporated to dryness. The residue was triturated with ether, the solid components were recrystallized from ethyl acetate by addition of ether, and the colorless crystals were dissolved in methanol. The solution was acidified with ethereal hydrochloric acid, and the colorless crystalline precipitate formed thereby was collected, yielding 2.5 gm of the compound of the formula

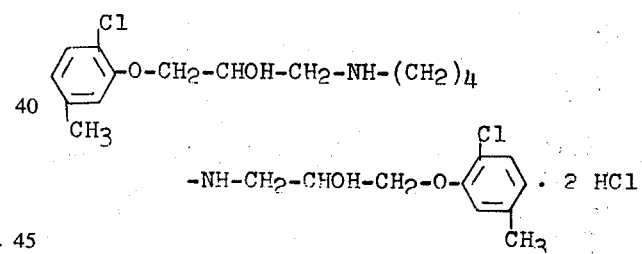

which had a melting point of 233°–235°C.

EXAMPLE 62

N,N'-Bis-[1'-(2''-chloro-5''-methyl-phenoxy)-2'-hydroxy-propyl-3']-1,2-ethylenediamine · 2 HCl by method A 10 gm (0.05 mol) of 1-(2'-chloro-5'-methyl-phenoxy)-2,3-epoxy-propane were dissolved with 1.5 gm (0.025 mol) of ethylenediamine in 100 ml of ethanol. After refluxing the solution for 2 hours, it was cooled with ice water, whereby the reaction product crystallized out which was collected by vacuum filtration and recrystallized from dimethylformamide. The colorless base, which melted at 156° to 160°C, was dissolved in methanol and ethereal HCl was added. The precipitate formed thereby was collected, yielding 3.2 gm of the compound named in the heading, which had a melting point of 255°–260°C.

EXAMPLE 63

N,N'-Bis-[1'-(2''-chloro-5''-methyl-phenoxy)-2'-hydroxy-propyl-3']-N,N'-bis-isopropyl-hexamethylene-1,6-diamine · 2 HCl by method B 16.8 gm (0.065 mol) of 1-(2'-chloro-5'-methyl-phenoxy)-3-isopropylamino-propanol-(2) were dissolved in 100 ml of ethanol, 7 gm of NaHCO$_3$ were added, and then 7.92 gm (0.0325 mol) of 1,6-dibromohexane were added dropwise. The resulting mixture was refluxed for 10 hours. Subsequently, after distilling off the solvent, the residue was acidified with HCl, the aqueous phase extracted with ether and made alkaline with NaOH. The precipitate was taken up in chloroform, and the solution was washed with water. After drying over MgSO$_4$, the CHCl$_3$ was distilled off, and the residual mixture of bases was separated by column-chromatography. The pure substance (8.4 gm) was dissolved in a little ethanol, alcoholic HCl and ether were added, and the oil which separated out was dissolved in acetonitrile. Upon addition of ether, a colorless crystalline substance separated out which was recrystallized from ethanol by addition of ether, yielding 6.8 gm of the compound named in the heading, which had a melting point of 187°–189° C.

EXAMPLE 64

N,N'-Bis-[1'-(2''-chloro-5''-methyl-phenoxy)-2'-hydroxypropyl-3']-N,N'-bis-methyl-hexamethylene-1,6-diamine · 2 HCl by method D 2.068 gm (0.004 mol) of N,N'-bis-[1'-(2''-chloro-5''-methyl-phenoxy)-2'-hydroxypropyl-3']-hexamethylene-1,6-diamine were mixed with 4.6 gm (0.1 mol) of formic acid and 6 ml of 30% formaline solution, and the mixture was heated to 90°C. After the evolution of CO$_2$ had started, the temperature was held at 90°C for 2 hours. The cooled solution was made alkaline with NaOH, extracted with CHCl$_3$, and the organic phase was washed with H$_2$O and dried over Na$_2$SO$_4$. After distilling off the chloroform, 2.2 gm of a residue were obtained which was dissolved in acetonitrile, and the solution was acidified with alcoholic HCl. The crystalline product formed thereby was recrystallized from methanol by addition of ether, yielding 1.8 gm of the compound named in the heading, which had a melting point of 185°–189°C.

EXAMPLE 65

N,N'-Bis-[1'-(2''-chloro-5''-methyl-phenoxy)-2'-hydroxypropyl-3']-N,N'-bis-benzyl-hexamethylene-1,6-diamine · 2 HCl by method A 15 gm (0.075 mol) of 1-(2'-chloro-5'-methyl-phenoxy)-2,3-epoxy-propane were dissolved in 200 ml of absolute ethanol, 10.4 gm (0.035 mol) of 1,6-dibenzylamino-hexane were added, and the mixture was refluxed for 2 hours. After distilling off the solvent, the residue was dissolved in acetonitrile, and the solution was acidified with alcoholic HCl. The precipitated crystals were recrystallized from methanol by addition of ether, yielding 19.4 gm of the compound of the formula

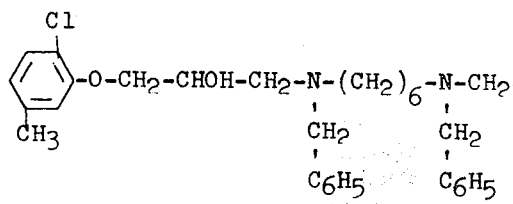

which had a melting point of 185°–188°C.

EXAMPLE 66

N,N'-Bis-[1'-92''-chloro-5''-methyl-phenoxy)-2'-hydroxypropyl-3']-hexamethylene-1,6-diamine · 2 HCl 14.5 gm (0.019 mol) of N,N'-bis-[1'-(2''-chloro-5-methyl-phenoxy)-2'-hydroxy-propyl-3']-N,N'-dibenzyl-hexamethylene-1,6-diamine · 2 HCl were hydrogenated over palladized coal in 200 ml of methanol at 6 atm./60°C until absorption of the theoretical quantity of hydrogen. After separation of the catalyst, the solvent was distilled off, and the solid residue was recrystallized twice from ethanol by addition of ether. 5.6 gm of the compound named in the heading, which had a melting point of 207°–210°C, were obtained.

EXAMPLE 67

N,N'-bis-[1'-(2''-cyano-phenoxy)-2'-hydroxy-propyl-3']-propylene-1,3-diamine by method I 9.25 gm (0.01 mol) of epichlorohydrin were dissolved in 50 ml of ethanol, a solution of 3.7 gm of propylene-1,3-diamine in 30 ml of ethanol was added, and the mixture was heated at 55°C for 2 hours, while stirring. Then, the solvent was distilled off, and the residue was purified on a silicagel column. 4.2 gm (0.02 mol) of the isolated N,N'-bis-(2'-hydroxy-3'-chloro-propyl-1')-propylene-1,3-diamine were dissolved in 20 ml of methanol, and the solution was added dropwise to a solution of 4.8 gm (0.04 mol) of 2-cyano-phenol and 2.2 gm of KOH (0.04 mol) in 30 ml of methanol, while stirring. Then, the mixture was refluxed for 6 hours. After distilling off the solvent, the reaction mixture was separated on a silicagel column. The fractions containing the desired compound were combined, the mixture of solvents was distilled off, the residue was dissolved in a little ethanol, and ethereal HCl was added. The precipitated colorless crystals had a melting point of 217°–220°C and were identified to be the compound of the formula

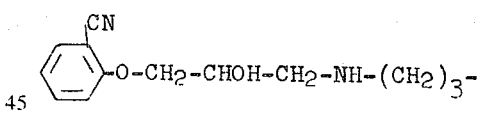

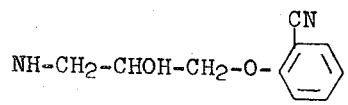

The compounds embraced by formula I and their nontoxic, pharmacologically acceptable acid addition salts have useful pharmacodynamic properties. More particularly, the compounds of the present invention exhibit β-adrenergic receptor blocking and hypotensive activities in warm-blooded animals, such as guinea pigs, cats and dogs.

Of particular significance is the cardio-selective blocking action upon the β-receptors of the heart, i.e., the so-called $\beta_1$-activity, which the compounds according to the present invention produce.

Therefore, the compounds embraced by formula I and their non-toxic, pharmacologically acceptable acid addition salts are useful for the treatment of prophylaxis of disorders of the heart or coronary vessels as well as hypertension in warm-blooded animals.

Particularly effective are those compounds of the formula I wherein $R_1$ is an unsaturated substituent in o- or p-position with respect to the side-chain, such as cyano, ethynyl, allyl, allyloxy or propargyloxy. Compounds of the formula I wherein each of the phenyl moieties is mono-substituted with straight or branched hydroxyalkyl are also very effective. Compounds wherein $R_1$ is acylamino, such as acetamido, or alkyl- or dialkyl-sulfonamido, such as methyl-sulfonamide or dimethyl-sulfonamido, in o- or p-position with respect to the side-chain are very good cardioselective $\beta$-blockers, as are those compounds of the formula I wherein $R_1$ is p-COOH.

Expecially effective are N,N'-bis-[2'-hydroxy-3'-(2''-cyano-phenoxy)-1'1n-propyl]-1,6-hexamethylenediamine and its non-toxic, pharmacologically acceptable acid addition salts, for example.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. The effective single dosage unit range of the compounds according to the present invention is from 0.0016 to 5.0 mgm/kg body weight. The preferred oral dosage unit range is 0.016 to 1.0 mgm//kg body weight, and the preferred parenteral dosage unit range is 0.0016 to 0.5 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 68

Tablets

The tablet composition is compounded from the following ingredients:

| | |
|---|---|
| N,N'-bis-[2'-hydroxy-3'-(4'''-acetamido-phenoxy)-1'-propyl]-1,2-ethylenediamine . 2 HCl | 20.0 parts |
| Corn starch | 164.0 do. |
| Calcium phosphate | 240.0 do. |
| Magnesium stearate | 1.0 do. |
| | 425.0 parts |

Preparation:

The individual ingredients are intimately admixed with each other, and the mixture is granulated in the conventional way. Then, the granulate is compressed into 425 mgm-tablets each of which contains 20 mgm of the ethylenediamine compound and is an oral dosage unit composition with effective $\beta$-adrenergic receptor blocking and hypotensive action.

EXAMPLE 69

Gelatin capsules

The capsule filler composition is compounded from the following ingredients:

| | |
|---|---|
| N,N'-bis-[2'-hydroxy-3'-(2''-cyano-phenoxy)-1'-propyl]-1,6-hexamethylenediamine . 2 HCl | 25.0 parts |
| Corn starch | 175.0 do. |
| | 200.0 parts |

Preparation:

The ingredients are intimately admixed with each other, and 200 mgm portions of the mixture are filled into gelatin capsules of suitable size. Each capsule contains 25 mgm of the hexamethylenediamine compound and is an oral dosage unit composition with effective $\beta$-adrenergic receptor blocking and hypotensive action.

EXAMPLE 70

Hypodermic solution

The solution is compounded from the following ingredients:

| | |
|---|---|
| N,N'-bis-[2'-hydroxy-3'-(3''-trifluoro-methyl-phenoxy)-1'-propyl]-1,6-hexamethylenediamine . 2 HCl | 1.5 parts |
| Sodium salt of EDTA (ethylenediamine tetraacetic acid) | 0.2 do. |
| Distilled water q.s.ad | 100.0 do. |

Preparation:

The active ingredient and the EDTA salt are dissolved in a sufficient amount of distilled water, and the solution is diluted with water to the indicated weight. The solution is filtered until free from suspended particles and filled into 1 cc-ampules under aspetic conditions. Finally, the ampules are sterilized and sealed. Each ampule contains 15 mgm of the hexamethylenediamine compound, and the contents thereof are an injectable dosage unit composition with effective $\beta$-adrenergic receptor blocking and hypotensive action.

EXAMPLE 71

Coated sustained-release tablets

The tablet core composition is compounded from the following ingredients:

| | |
|---|---|
| N,N'-bis-[1'-(2''-chloro-5''-methyl-phenoxy)-2'-hydroxypropyl-3']-1,2-ethylenediamine dihydrochloride | 25.0 parts |
| Carboxymethyl cellulose (CMC) | 295.0 do. |
| Stearic acid | 20.0 do. |
| Celluloseacetate phthalate (CAP) | 40.0 do. |
| | 380.0 parts |

Preparation

The active ingredients, the CMC and the stearic acid are intimately mixed with each other, and the mixture is granulated in the conventional way, using a solution of the CAP in 200 mgm of an ethanol/ethylacetate mixture as the moistener. Then, the granulate is compressed into 0.380 mgm-tablet cores, which are subsequently coated with a mixture of sugar and polyvinylpyrrolidone. Each coated tablet contains 25 mgm of the ethylenediamine compound and is an oral dosage unit composition with effective $\beta$-adrenergic receptor blocking and hypotensive action.

Dosage unit compositions containing a compound of the present invention as an active ingredient may, in addition, also contain one or more other active ingredients with different pharmacological activities, such as coronary dilators, sympathomimetics and tranquilizers, as illustrated by the following examples.

EXAMPLE 72

Coated sustained-release tablets

The tablet core composition is compounded from the following ingredients:

| | |
|---|---|
| N,N'-bis-[2'-hydroxy-3'-(2''-allyloxy-phenoxy)-1'-propyl]-1,6-hexamethyl-enediamine . 2 HCl | 25.0 parts |
| Oxazepam | 20.0 do. |
| Carboxymethyl cellulose (CMC) | 295.0 do. |
| Stearic acid | 20.0 do. |
| Celluloseacetatephthalate (CAP) | 40.0 do. |
| | 400.0 parts |

Preparation:

The tablets are manufactured in a manner analogous to that described in Example 71. Each tablet contains 25 mgm of the hexamethylenediamine compound and 20 mgm of oxazepam, and is an oral dosage unit composition with effective β-adrenergic receptor blocking, hypotensive and tranquilizing action.

EXAMPLE 73

Tablets

The tablet composition is compounded from the following ingredients:

| | |
|---|---|
| N,N'-bis-[2'-hydroxy-3'-(4''-acetamino-phenoxy)-1'-propyl]-1,6-hexamethylene-diamine . 2 HCl | 35.0 parts |
| 2,6-bis-(diethanolamino)-4,8-dipiperi-dino-pyrimido-[5,4-d]-pyrimidine | 75.0 do. |
| Lactose | 164.0 do. |
| Corn starch | 194.0 do. |
| Colloidal silicic acid | 14.0 do. |
| Polyvinylpyrrolidone | 6.0 do. |
| Magnesium stearate | 2.0 do. |
| Soluble starch | 10.0 do. |
| | 500.0 parts |

Preparation:

The active ingredients are intimately admixed with the lactose, the corn starch, the colloidal silicic acid and the polyvinylpyrrolidone, and the mixture is granulated in the usual way, using an aqueous solution of the soluble starch as the moistener. The granulate is admixed with the magnesium stearate, and the composition is compressed into 500 mgm-tablets in a conventional tablet making machine. Each tablet contains 35 mgm of the hexamethylenediamine compound and 75 mgm of the pyrimidopyrimidine compound, and is an oral dosage unit composition with effective β-adrenergic receptor blocking, hypotensive and coronary dilating action.

Analogous results are obtained when any one of the other compounds embraced by formula I or a non-toxic acid addition salt thereof was substituted for the particular alkylenediamine derivative in Examples 68 through 73. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula $$\begin{array}{c} R_1 \\ R_2 \diagdown \diagdown \diagdown \\ \diagup \diagup \diagup -OCH_2-CHOH-CH_2-N-(CH_2)_n \\ R_3 \quad\quad\quad\quad\quad\quad\quad\quad\quad R_4 \end{array}$$

$$\begin{array}{c} \quad\quad\quad\quad\quad\quad\quad\quad\quad R_1 \\ \quad\quad\quad\quad\quad\quad\quad\quad\quad\diagup\diagup R_2 \\ -N-CH_2-CHOH-CH_2-O-\diagdown\diagdown \\ R_4 \quad\quad\quad\quad\quad\quad\quad\quad\quad R_3 \end{array}$$

wherein $R_1$ is —$(CH_2)_x$—CN, where $x$ is 0, 1, 2 or 3, $R_2$ is hydrogen, halogen, alkyl of 1 to 5 carbon atoms, alkoxy of 1 to 5 carbon atoms, alkenyl of 2 to 5 carbon atoms or alkenyloxy of 2 to 5 carbon atoms;

$R_3$ is hydrogen, halogen, alkyl of 1 to 5 carbon atoms or alkoxy of 1 to 5 carbon atoms;

$R_2$ and $R_3$, together with each other and the carbon atoms to which they are attached, form a saturated or unsaturated carbocyclic ring of up to 6 carbon atoms;

$R_4$ is hydrogen, alkyl of 1 to 5 carbon atoms or aralkyl; and $n$ is an integer from 1 to 10, inclusive;

or a non-toxic, pharmcologically acceptable acid addition salt thereof.

2. A compound of claim 1, which is of the formula $$\begin{array}{c} CN \\ R_2 \diagdown \diagdown \diagdown \\ \diagup \diagup \diagup -OCH_2-CHOH-CH_2-N-(CH_2)_n- \\ R_3 \quad\quad\quad\quad\quad\quad\quad\quad\quad R_4 \end{array}$$

$$\begin{array}{c} \quad\quad\quad\quad\quad\quad\quad\quad\quad NC \\ \quad\quad\quad\quad\quad\quad\quad\quad\quad\diagup\diagup R_2 \\ -N-CH_2-CHOH-CH_2-O-\diagdown\diagdown \\ R_4 \quad\quad\quad\quad\quad\quad\quad\quad\quad R_3 \end{array}$$

wherein $R_2$ is hydrogen, halogen, alkyl of 1 to 5 carbon atoms, alkoxy of 1 to 5 carbon atoms, alkenyl of 2 to 5 carbon atoms or alkenyloxy of 2 to 5 carbon atoms;

$R_3$ is hydrogen, halogen, alkyl of 1 to 5 carbon atoms or alkoxy of 1 to 5 carbon atoms;

$R_2$ and $R_3$, together with each other and the carbon atoms to which they are attached, form a saturated or unsaturated carbocyclic ring of up to 6 carbon atoms;

$R_4$ is hydrogen, alkyl of 1 to 5 carbon atoms or aralkyl; and $n$ is an integer from 1 to 10, inclusive;

or a non-toxic, pharmacologically acceptable acid addition salt thereof.

3. A compound of claim 2, which is racemic or optically active N,N'-bis-[2'-hydroxy-3'-(2''-cyanophenoxy)-1'1n-propyl]-1,6-hexamethylenediamine or a non-toxic, pharmacologically acceptable acid addition salt thereof.

4. N,N'-bis[2'-hydroxy-3'-(2''-cyano-phenoxy)-1'-n-propyl]-1,6-hexamethylenediamine.

* * * * *

PO-1050
(5/69)

UNITED STATES PATENT OFFICE
CERTIFICATE OF CORRECTION

Patent No. 3,888,898          Dated June 10, 1975

Inventor(s) HERBERT KOPPE, HELMUT STAHLE, WERNER KUMMER, GOJKO MUACEVIC and WERNER TRAUNECKER It is certified that error appears in the above-identified patent and that said Letters Patent are hereby corrected as shown below:

Column 1, Line 68    "proparglylox" should read --propargylox--

Column 4, Line 31    "and $R_4$" should read --'to $R_4$--

Column 5, Line 4    "perioxide" should read -- peroxide --

Column 9, Line 13    "porpyl" should read -- propyl --

Column 14, Line 9    "HCL" should read -- HCl --

Column 17, Line 3    "ethano" should read -- ethanol --

Column 18, Line 4    "9" should read -- ( --

Column 23, Line 1    "1n" should read -- -n --

Signed and Sealed this ninth Day of September 1975

[SEAL]

Attest:

RUTH C. MASON          C. MARSHALL DANN
*Attesting Officer*          *Commissioner of Patents and Trademarks*